(12) United States Patent
Neto

(10) Patent No.: US 7,628,108 B2
(45) Date of Patent: *Dec. 8, 2009

(54) LARGE SCALE MODULAR FRUIT JUICE EXTRACTION SYSTEM

(76) Inventor: Carlos Mendes Neto, 12309 Rua Voluntarios de Patria 1766-apt. 101, CEP 14-801-320, Araraquara, SP (BR)

( * ) Notice: Subject to any disclaimer, the term of this patent is extended or adjusted under 35 U.S.C. 154(b) by 1004 days.

This patent is subject to a terminal disclaimer.

(21) Appl. No.: 10/932,613

(22) Filed: Sep. 2, 2004

(65) Prior Publication Data

US 2005/0028690 A1 Feb. 10, 2005

Related U.S. Application Data

(63) Continuation-in-part of application No. 09/377,937, filed on Aug. 20, 1999, now abandoned, and a continuation-in-part of application No. 09/377,936, filed on Aug. 20, 1999, now abandoned, and a continuation-in-part of application No. 09/028,187, filed on Feb. 23, 1998, now Pat. No. 7,086,328, and a continuation-in-part of application No. 08/884,529, filed on Jun. 27, 1997, now abandoned, and a continuation-in-part of application No. 08/763,679, filed on Dec. 11, 1996, now abandoned, and a continuation-in-part of application No. 08/759,727, filed on Dec. 6, 1996, now abandoned, and a continuation-in-part of application No. 08/759,722, filed on Dec. 6, 1996, now Pat. No. 5,720,219, and a continuation-in-part of application No. 08/759,723, filed on Dec. 6, 1996, now abandoned, and a continuation-in-part of application No. 08/681,626, filed on Jul. 29, 1996, now Pat. No. 5,802,964, and a continuation-in-part of application No. 08/681,627, filed on Jul. 29, 1996, now Pat. No. 5,720,218, and a continuation-in-part of application No. 08/647,066, filed on May 9, 1996, now Pat. No. 5,655,441.

(30) Foreign Application Priority Data

| Jun. 19, 1995 | (BR) | .................................... 9502244 |
| Aug. 1, 1995 | (BR) | .................................... 5501198 |
| Aug. 1, 1995 | (BR) | .................................... 7501779 U |
| Dec. 8, 1995 | (BR) | .................................... 7502784 U |
| Dec. 8, 1995 | (BR) | .................................... 7502785 U |
| Dec. 8, 1995 | (BR) | .................................... 7502786 U |
| Dec. 15, 1995 | (BR) | .................................... 7502994 U |
| Sep. 6, 2003 | (BR) | .................................... 0303804 |

(51) Int. Cl.
*A23N 1/02* (2006.01)

(52) U.S. Cl. .............................. 99/509; 99/495; 99/510; 99/513; 100/98 R; 100/108; 100/213

(58) Field of Classification Search ........... 99/509–513, 99/495; 100/98 R, 108, 213–218, 125, 245
See application file for complete search history.

(56) References Cited

U.S. PATENT DOCUMENTS 1,514,094 A 11/1924 Noble (Continued)

FOREIGN PATENT DOCUMENTS

EP 0442535 A1 8/1991

(Continued)

*Primary Examiner*—Timothy F. Simone
(74) *Attorney, Agent, or Firm*—David G. Maire; Joseph Fischer; Beusse Wolter Sanks Mora & Maire, P.A.

(57) ABSTRACT

A juicing apparatus is provided in which a single actuating element (2) drives a multiple number, such as three, of movable peeler cups (4), against their respective paired or matched fixed peeler cups (3), in a manner such to simultaneously provide for the extraction of juice from a number of fruit (19), one in each of the matched pairs of fixed and movable peeler cups (3, 4), said matched pairs of peeler cups being subjected to substantially the same force and reciprocating action as the other. Blades (38, 39) of the fixed and movable peeler cups (3, 4) engage the peel of the fruit (19) and provide for its removal. In certain embodiments, within each fixed peeler cup (3) is a filtering device (7) comprising a sharpened end (43) that meets the fruit (19), and a plurality of slits in the wall(s) of the filtering device for passage of juice compressed from the fruit.

10 Claims, 7 Drawing Sheets

U.S. PATENT DOCUMENTS

| | | | | |
|---|---|---|---|---|
| 2,116,325 | A | 5/1938 | Rogers | |
| 2,346,571 | A | 4/1944 | Delay | |
| 2,420,679 | A | 5/1947 | Pipkin | |
| 2,522,800 | A | 9/1950 | Quiroz | |
| 2,534,554 | A | 12/1950 | Kahre | |
| 2,540,345 | A | 2/1951 | Pipkin | |
| 2,713,434 | A | 7/1955 | Belk | |
| 2,723,618 | A | 11/1955 | Matthews | |
| 2,748,693 | A | 6/1956 | Drain et al. | |
| 2,856,846 | A | 10/1958 | Belk | |
| 3,053,170 | A | 9/1962 | Cook | |
| 3,086,455 | A | 4/1963 | Belk | |
| 3,162,114 | A | 12/1964 | Quiroz | |
| 3,236,175 | A | 2/1966 | Belk | |
| 3,269,301 | A | 8/1966 | Krause | |
| 3,682,092 | A | 8/1972 | Breton et al. | |
| 3,866,528 | A * | 2/1975 | Montagroni | 99/495 |
| 4,154,163 | A | 5/1979 | Niemann | |
| 4,300,449 | A | 11/1981 | Segredo | |
| 4,376,409 | A | 3/1983 | Belk | |
| 4,391,185 | A * | 7/1983 | Stanley | 99/489 |
| 4,459,906 | A | 7/1984 | Cound et al. | |
| 4,700,620 | A | 10/1987 | Cross | |
| 4,905,586 | A | 3/1990 | Anderson et al. | |
| 4,917,007 | A | 4/1990 | Nelson | |
| 4,922,813 | A | 5/1990 | Compri | |
| 4,922,814 | A | 5/1990 | Anderson et al. | |
| 4,951,563 | A | 8/1990 | Warren et al. | |
| 4,961,374 | A | 10/1990 | Lee | |
| 5,035,174 | A | 7/1991 | Seal, Jr. | |
| 5,070,778 | A | 12/1991 | Cross et al. | |
| 5,097,757 | A | 3/1992 | Antonio | |
| 5,156,872 | A | 10/1992 | Lee | |
| 5,170,700 | A | 12/1992 | Anderson et al. | |
| 5,182,984 | A | 2/1993 | Wagner | |
| 5,199,348 | A | 4/1993 | Cimenti | |
| 5,249,514 | A | 10/1993 | Otto et al. | |
| 5,331,887 | A | 7/1994 | Beck | |
| 5,339,729 | A | 8/1994 | Anderson | |
| 5,381,730 | A | 1/1995 | Kim | |
| 5,396,836 | A | 3/1995 | Kim | |
| 5,483,870 | A | 1/1996 | Anderson et al. | |
| 5,655,441 | A | 8/1997 | Mendes | |
| 5,720,218 | A | 2/1998 | Mendes | |
| 5,720,219 | A | 2/1998 | Mendes | |
| 5,802,964 | A * | 9/1998 | Mendes | 99/509 |
| 6,161,475 | A | 12/2000 | Coppelletti | |
| 6,293,189 | B1 * | 9/2001 | Evans et al. | 99/510 |

FOREIGN PATENT DOCUMENTS

| | | |
|---|---|---|
| EP | 0757896 A1 | 2/1997 |
| GB | A-7 539 88 | 8/1956 |
| GB | 2 116 021 A | 9/1983 |

* cited by examiner

LARGE SCALE MODULAR FRUIT JUICE EXTRACTION SYSTEM

CROSS REFERENCE TO RELATED APPLICATIONS

This application is a continuation-in-part application of previous applications by the same inventor bearing:

1) U.S. Ser. No. 08/647,066 filed May 9, 1996, (which claims priority, under 35 U.S. Code § 119 based on Brazilian Application No. PI-9502244-9 filed Jun. 19, 1995), now U.S. Pat. No. 5,655,441 issued Aug. 12, 1997;

2) U.S. Ser. No. 08/681,627 filed Jul. 29, 1996, (which claims priority, under 35 U.S. Code § 119 based on Brazilian Application No. MI-5501198-5 filed Aug. 1, 1995) now U.S. Pat. No. 5,720,218 issued Feb. 24, 1998;

3) U.S. Ser. No. 08/681,626 filed Jul. 29, 1996, now U.S. Pat. No. 5,802,964 (which claims priority, under 35 U.S. Code § 119 based on Brazilian Application No. MU-7501779-2 filed Aug. 1, 1995);

4) U.S. Ser. No. 08/759,723 filed Dec. 6, 1996, now abandoned (which claims priority, under 35 U.S. Code § 119 based on Brazilian Application No. MtJ-7502784-4 filed Dec. 8, 1995);

5) U.S. Ser. No. 08/759,722 filed Dec. 6, 1996, (which claims priority, under 35 U.S. Code § 119 based on Brazilian Application No. MU-7502785-2 filed Dec. 8, 1995) now U.S. Pat. No. 5,720,219 issued Feb. 24, 1998;

6) U.S. Ser. No. 08/759,727 filed Dec. 6, 1996, now abandoned (which claims priority, under 35 U.S. Code § 119 based on Brazilian Application No. MU-7502786-0 filed Dec. 8, 1995);

7) U.S. Ser. No. 08/763,679 filed Dec. 11, 1996, now abandoned (which claims priority, under 35 U.S. Code § 119 based on Brazilian Application No. MU-7502994-4 filed Dec. 15, 1995);

8) U.S. Ser. No. 08/884,529 filed Jun. 27, 1997, now abandoned (which claims priority, under 35 U.S. Code § 119 based on Brazilian Applications No. P1-9502218-0 filed Jun. 12, 1995; No. P1-9502244-9 filed Jun. 19, 1995; No. MI-5501197-7 filed Aug. 1, 1995; No. MI-5501198-5 filed Aug. 1, 1995; No. MI-5501199-3 filed Aug. 1, 1995; No. MU-7501779-2 filed Aug. 1, 1995; No. MU-7501780-6 filed Aug. 1, 1995; No. MU-7501781-4 filed Aug. 1, 1995; No. PI-9503518-4 filed Aug. 1, 1995; No. MU-7501563-3 filed Aug. 7, 1995; No. PI-9503109-0 filed Aug. 7, 1995; No. MI-5501053-9 filed Aug. 7, 1995; No. MI-5501976-5 filed Dec. 8, 1995; No. MU-7502784-4 filed Dec. 8, 1995; No. MU-7502785-2 filed Dec. 8, 1995; No. MU-7502786-0 filed Dec. 8, 1995; and, No. P413-7502994-4 filed Dec. 15, 1995);

9) U.S. Ser. No. 09/028,187 filed Feb. 23, 1998, now U.S. Pat. No. 7,086,328 (which claims priority, under 35 U.S. Code § 119 based on Brazilian Applications No. PI-9502218-0 filed Jun. 12, 1995; No. PI-9502244-9 filed Jun. 19, 1995; No. MI-5501197-7 filed Aug. 1, 1995; No. MI-5501198-5 filed Aug. 1, 1995; No. MI-5501199-3 filed Aug. 1, 1995; No. MU-7501779-2 filed Aug. 1, 1995; No. MU-7501780-6 filed Aug. 1, 1995; No. MU-7501781-4 filed Aug. 1, 1995; No. PI-9503518-4 filed Aug. 1, 1995; No. MU-7501563-3 filed Aug. 7, 1995; No. PI-9503109-0 filed Aug. 7, 1995; No. MI-5501053-9 filed Aug. 7, 1995; No. MI-5501976-5 filed Dec. 8, 1995; No. MU-7502784-4 filed Dec. 8, 1995; No. MU-7502785-2 filed Dec. 8, 1995; No. MU-7502786-0 filed Dec. 8, 1995; and, No. P413-7502994-4 filed Dec. 15, 1995);

10) U.S. Ser. No. 09/377,936 filed Aug. 20, 1999, now abandoned (which claims priority, under 35 U.S. Code § 119 based on all of the applications in Items 1-9 above); and, 11) U.S. Ser. No. 09/377,937 filed Aug. 20, 1999,now abandoned (which claims priority, under 35 U.S. Code § 119 based on all of the applications in Items 1-9 above).

12) This application is a continuation-in-part of Brazilian Application No. PI 0303804-1, filed Sep. 6, 2003 in Brazil, and priority to this application is claimed under 35 U.S.C. § 119(a).

Priority to the above applications is requested under 35 U.S.C. §§ 119 and 120, and the entirety of these previous applications are incorporated herein by reference as if set forth in full below.

BACKGROUND OF THE INVENTION

The present patent of invention refers to "IMPROVEMENT IN A LARGE SCALE MODULAR FRUIT JUICE EXTRACTION SYSTEM", or be it, as the nomenclature indicates, a system developed with the intent to obtain juice of citrus fruit such as orange, tangelo, grapefruit, lemon, lime, tangerine, mekan, ponkan, and other non-citrus fruit of round and semi spherical shapes.

The important characteristics of the system presented here is the fact that it is substantially compact, modular, durable, simple and produces juice of high quality by the method of extraction, and additionally, thanks to its compact and modular configuration, permits the production of juice on a large scale.

The state of the art is known by various previous patents by the same inventor, including patent PI9502244-9, patent PI9503109-0, patent PI0005957, patent MU7800719-4, patent DI5501053-9, patent MU7502784-4 and other Brazilian patents, as well as also including international patents originated from these, like North American patents, such as U.S. Pat. No. 5,655,441, U.S. Pat. No. 5,720,218, U.S. Pat. No. 5,720,219 and U.S. Pat. No. 5,802,964, that revolutionized the market with the introduction of a method of juice extraction that eliminates the traditional bitter taste of citrus juices, by eliminating the contact of the peel oil with the extracted juice.

Notwithstanding the improvements in the above-referenced patents and applications, several problems in the commercial fruit juicing industry remained unsolved. First, during replacement of existing juicing equipment with juicing machinery incorporated the horizontal juicing technology of the present applicant, there is a problem of how to maximize the juicing capacity on a per square foot of floor space below the existing fruit sorting and delivery systems. Associated with this is a desire, based on economics and capital investment, to reduce any modifications to such existing fruit sorting and delivery systems. Second, there are associated problems inherent in new equipment, first in the high capital cost when there is redundancy in basic structures, and second in the operational and output-lowering downtime when one unit, such as a power drive, in a larger multi-unit module, fails and requires that the entire multi-unit module is taken off the production line. As disclosed herein, the present invention solves these problems.

The equipment based its improvements by use of a process of peeling the fruit before the extraction of the juice is completed, by use of a fixed peeler cup (concave and semi-hemispherical) and, by the action of the pressing of the fruit by another identical movable peeler cup, in which in the joint operation of closing, acts on the peel by cutting longitudinal peel strips. During and immediately after this process, almost instantaneously, the internal portions of the fruit containing the pulp and juice, enter into a filtering device, that forces the juice to pass through its radial slits and is then collected in the juice collector, which has a lower end that makes it possible, by the action of gravity, to flow to a tubular juice collector. The core of the fruit now drained of its juice and in its dried state is then expelled by a plunger, returning in the direction of the opening of the filter, in a way that it is completely expelled, being forced to vertically fall, by action of gravity, into and between the peeler cups, and finally, falling into peel and core transport devices.

Other advances were introduced in this system and were object of other patents and patent applications as cited earlier, nevertheless, always incorporating the original scope of the basic invention.

BRIEF SUMMARY OF THE INVENTION

The present invention also maintains the basic characteristics of the original patents, nevertheless, it provides for a single actuating element to move a number of, such as three, bodies of movable peeler cups, against their respective paired or matched fixed peeler cups, in a manner such to simultaneously extract juice from a number of fruit, one in each of the matched pairs of fixed and movable peeler cups, each of said matched pairs of peeler cups being subjected to substantially the same force and reciprocating action as the other.

This solution generates a large advantage in terms of cost/benefit, since it permits a greater compacting of the extraction units, making side by side installation possible in a new or existing production line, resulting in the saving and optimization of space utilization, since there are no longer any "dead" spaces between the extraction modules, as in the existing simple configuration of only one movable and one fixed peeler cup, or like in other extractor configurations based on older technologies.

The multi-body/single drive configuration presented here generates an economy in individual parts and in the overall assembly of the equipment, since this arrangement permitted use of a large number of parts common to the matched pairs of peeler cups, like for example, the actuator and its drive system. The smaller number of parts not only aggregate less overall cost, but reflects directly a smaller maintenance cost and consequently a lesser number of non productive machine hours, the sum of these advantages make for an increase of productivity in the equipment.

The example of a multiple of three configuration of a module results in simplification and time reduction in installation, controls, operation and cleaning of the equipment, as well as a better use of the energy required for its operation. It is appreciated that other numbers of juicing bodies, or units, may be driven by a single drive mechanism, for instance, four and five matched pairs of peeler cups in a module.

As cited earlier, this new compact and efficient configuration, results in a significant increase in efficiency and productivity, in a manner to produce a greater quantity of juice per square meter of plant space, which in turn makes juice production viable on a large industrial scale.

The quality and organoleptic characteristics of the extracted juice extracted with this technology are maintained as described in the original patents, with great improvement in relation to previous technologies, be it whether the equipment is small, medium or large in size. The high degree of modularity of the configuration here exposed, makes viable and facilitates the increase in productivity on a modular basis, permitting that production be initiated with a single module and permitting that, with the passing of time, many modules can be added to the juice production installations, permitting flexibility and increase of production in a juice production facility. This is an important characteristic of this invention, because it permits juice production facilities of a small scale be modularly increased until extremely large scale can be obtained, generating juice production facilities capable of producing millions of liters per year, and, independently of the largeness of the production capabilities, gain the advantages in the quality and organoleptic improvements of the juice extracted by this innovative technology.

In one embodiment of this invention, a machine is provided composed of three pairs of conical peeler cups, being three fixed and three movable, where for each fixed peeler cup there is a corresponding movable peeler cup, being that all three fixed peeler cups are affixed to the basic structure of the machine and the three movable peeler cups are affixed to a movable support which in turn is driven by a single actuator that directs, in a cycle of advance and return, the three concave movable peeler cups against the three fixed peeler cups. At the moment of opening of the three peeler cups, the respective fruits fall into their respective radially slit concave chambers, formed by the joining of the fixed concave fixed peeler cups with each of their respective movable peeler cups, in so doing, the movable peeler cups close upon the fruit, now inside the chambers, cutting the peel of the fruit, initiating the peeling process, and continuing on the cycle of juice production by the introduction of the internal core and pulp, containing the juice, into the three respective filtering devices. On the return of this assembly of three movable peeler cups, longitudinal rods, slaved to this return motion, actuated at its opposite end, a transverse member, which in turn is affixed at its extremities, to two parallel rods, which in turn are fixed at their extremities to a second transverse member, on the opposite end, which in turn is affixed to, three plungers, respectively positioned inside their respective fixed peeler cups, that slide internally in the cylindrical filtering device. Therefore, the return of the assembly containing the three movable peeler cups, because of this constructive configuration, simultaneously and collectively, the respective three plungers that operate inside their respective cylindrical filtering devices, in a manner such that, at the end of each cycle, the aforementioned plungers advance in the direction of going beyond the external pointed ends of the cylindrical filtering devices, thus resulting in the now dried fruit cores, without remaining liquid content, being expelled from the inside, to the outside of the filtering devices, falling vertically and passing through the blades of the peeler cups, which are now in their maximum open position. In this manner concluding the extractive cycle, being the equipment now ready for the initiation of the next cycle of extraction and prepared for the next fruit to be processed inside the respective pairs of fixed and movable peeler cups, in its multiple of three assembly.

This configuration permits a significant economy of space, complexity, energy, time of operation, maintenance costs, cleaning time of the equipment, labor costs, etc., being that the modularity and multiplicity of triple pairs of peeler cups in a same module, operating simultaneously, driven by a single actuation mechanism. As noted above, however, it is appreciated that other numbers of juicing bodies, or units (i.e., matched pairs of fixed and movable peeler cups), may be driven by a single drive mechanism, for instance, four and five.

By the use of the concept of only one actuator, to drive the three movable concave peeler cups of the embodiment described above, one can utilize various drive technologies, including hydraulic, pneumatic, electric, gears drives, screw types, or any combinations of actuating systems known or innovative, that may eventually be utilized, being that the actuation motion is restricted to a simple action of advance and return, and given the multiplicity of peeler cup pairs operating simultaneously, great simplicity and compactness can be assured in the construction and installation, thus increasing reliability and durability of the equipment, generating among other benefits, reduction of cleaning time, low energy consumption, low weight and low construction costs, as compared to other existing systems, including in relation to previously patented systems by this same inventor.

BRIEF DESCRIPTION OF THE DRAWINGS

The invention is described in the following attached figures, in which will be illustrated details including.

DETAILED DESCRIPTION OF THE INVENTION

Figure 1:
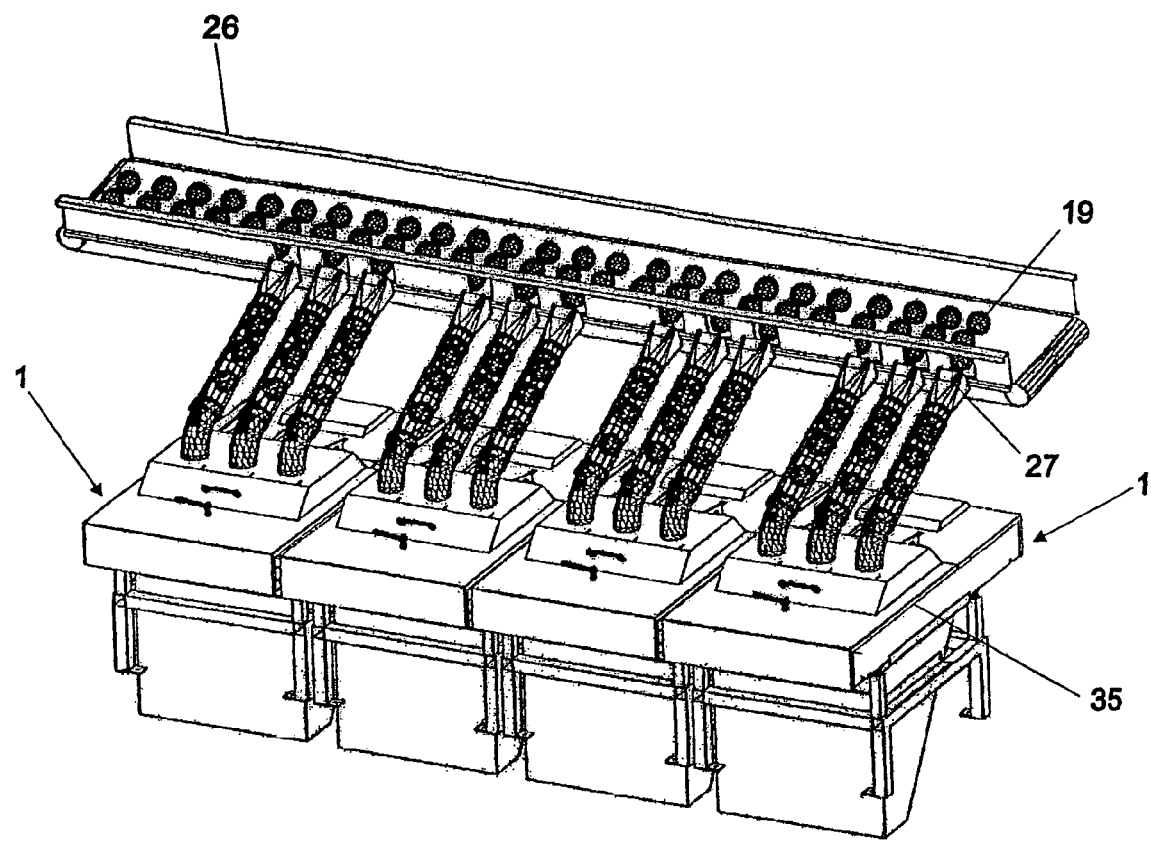
FIG. 1: A perspective view in a simulated assembly of a production line of the improvements in a large scale modular fruit juice extraction system, showing for illustrative purposes the feeding by use of a feed belt form which are mounted ducts that capture fruit.

The invention "IMPROVEMENT IN A LARGE SCALE MODULAR FRUIT JUICE EXTRACTION SYSTEM", object of this application for patent of invention, consists essentially of a system with a multiple modular configuration driven by a single drive mechanism. In the embodiment depicted in the figures appended hereto, a single actuator (2) device drives three bodies of movable peeler cups (4) toward their respective pairs of fixed peeler cups (3), in a manner such as to extract the juice of three fruits (19) simultaneously, being said peeler cups (3 and 4) positioned in parallel.

The respective modules (1) are equipped with covers (35), in which are installed sensors that will permit the operation of the equipment when these are closed.

Figure 3:
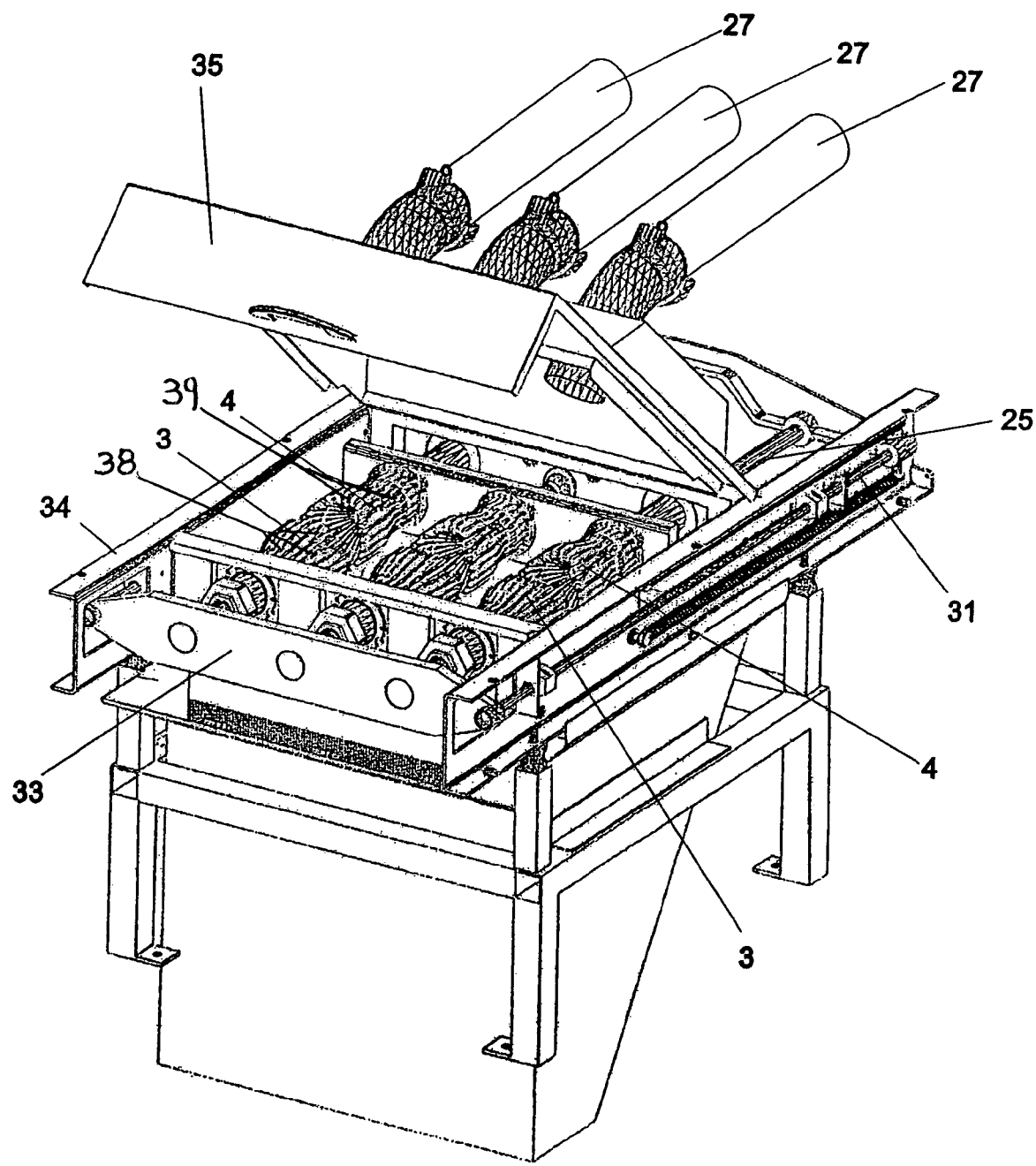
FIG. 3: A perspective view of a single module of the improvement in a large scale modular fruit juice extraction system, with the peeler cups in the open position with the cover in the open position, showing the fruit capturing ducts.
Figure 4:
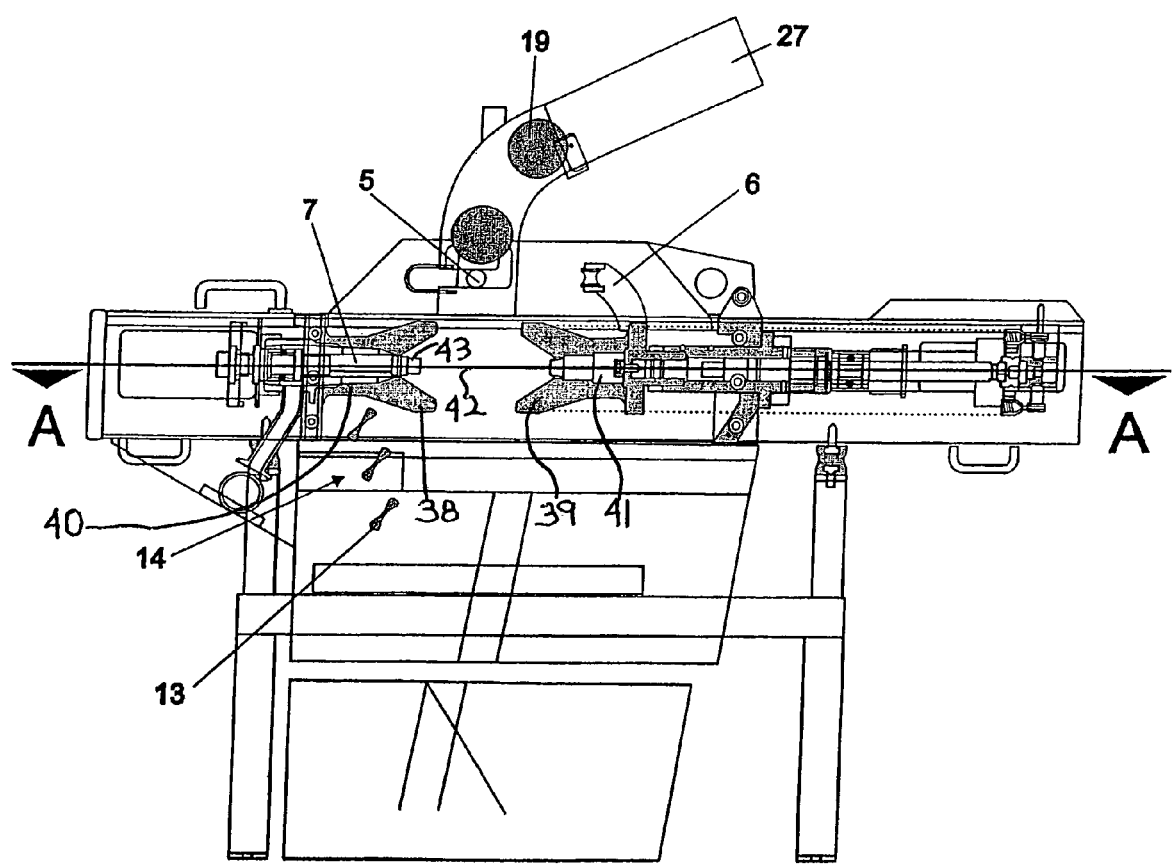
FIG. 4: A transverse cross sectional view of a single module of the improvement in a large scale modular fruit juice extraction system, showing the movable concave peeler cup in the open position, as well as the expulsion of the fruit's core, and its vertical falling into the core collector duct.
Figure 5:
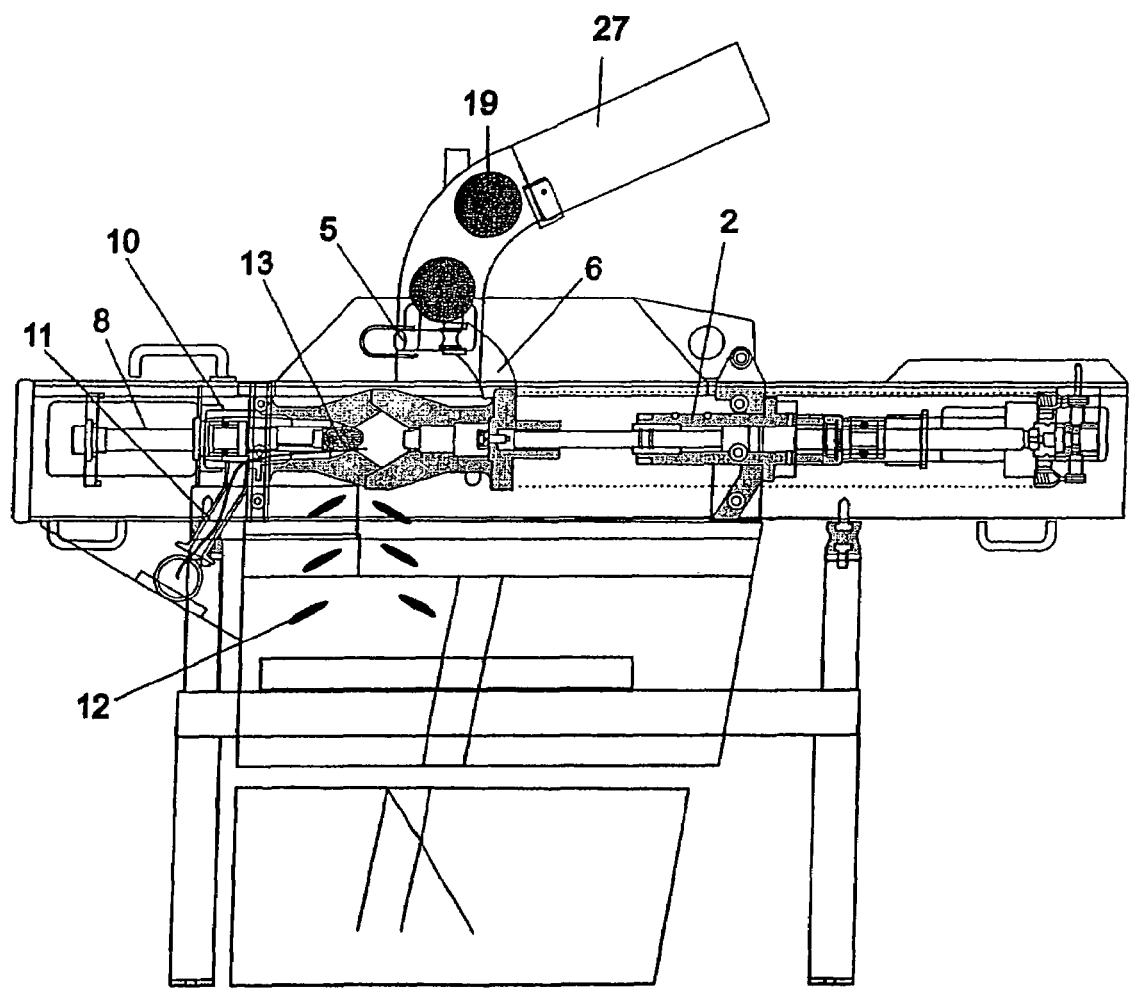
FIG. 5: A transverse cross sectional view of a single module of the improvement in a large scale modular fruit juice extraction system, showing the movable concave peeler cup closed, as well as the juice being filtered by the cylindrical filtering device, while the core of the fruit is inside this cylindrical filtering device, at this moment in the extraction cycle. It also shows the juice being collected in the juice collection chamber, slivers of peel falling vertically, in manner such that all of the products and sub products resulting are now directed to their other stages of processing.
Figure 6:
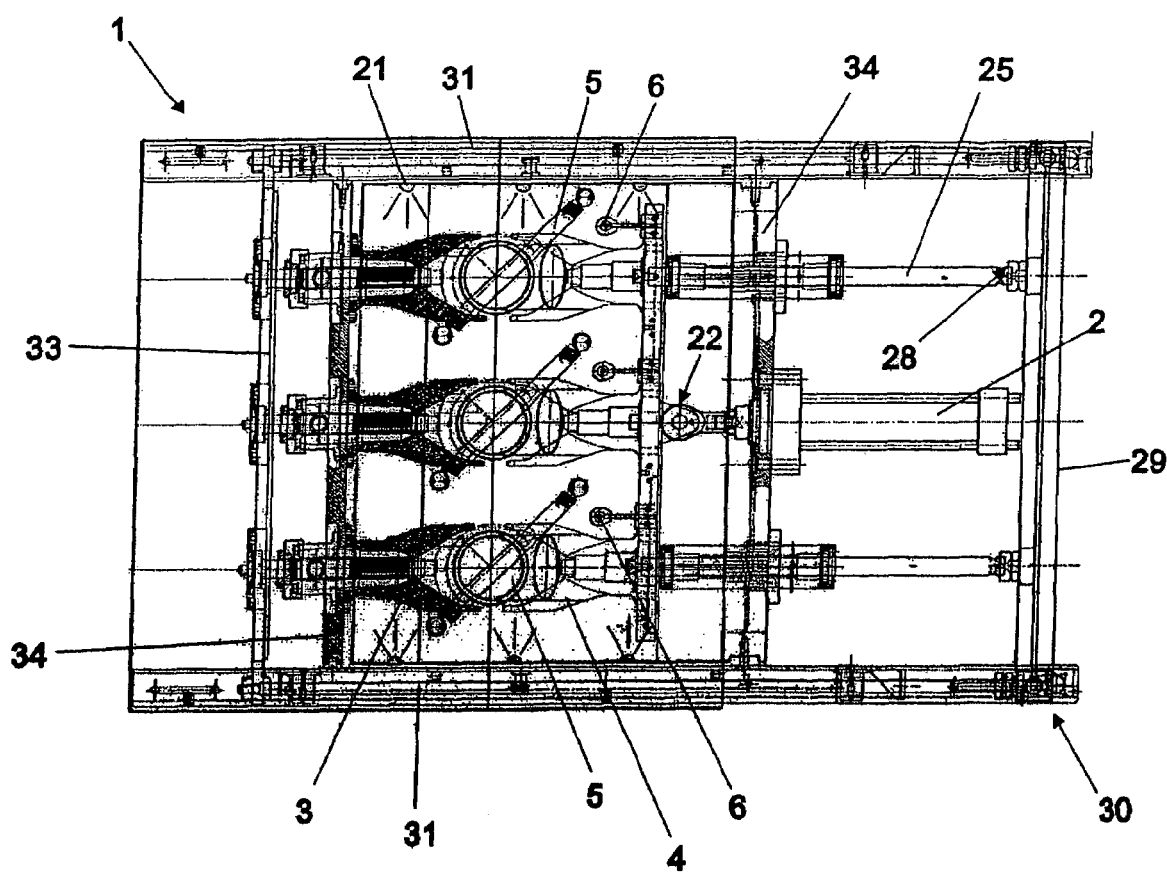
FIG. 6: A top view of the improvement in a large scale modular fruit juice extraction system, illustrated through a longitudinal cross section view represented by the cut line A-A in FIG. 4.
Figure 7:
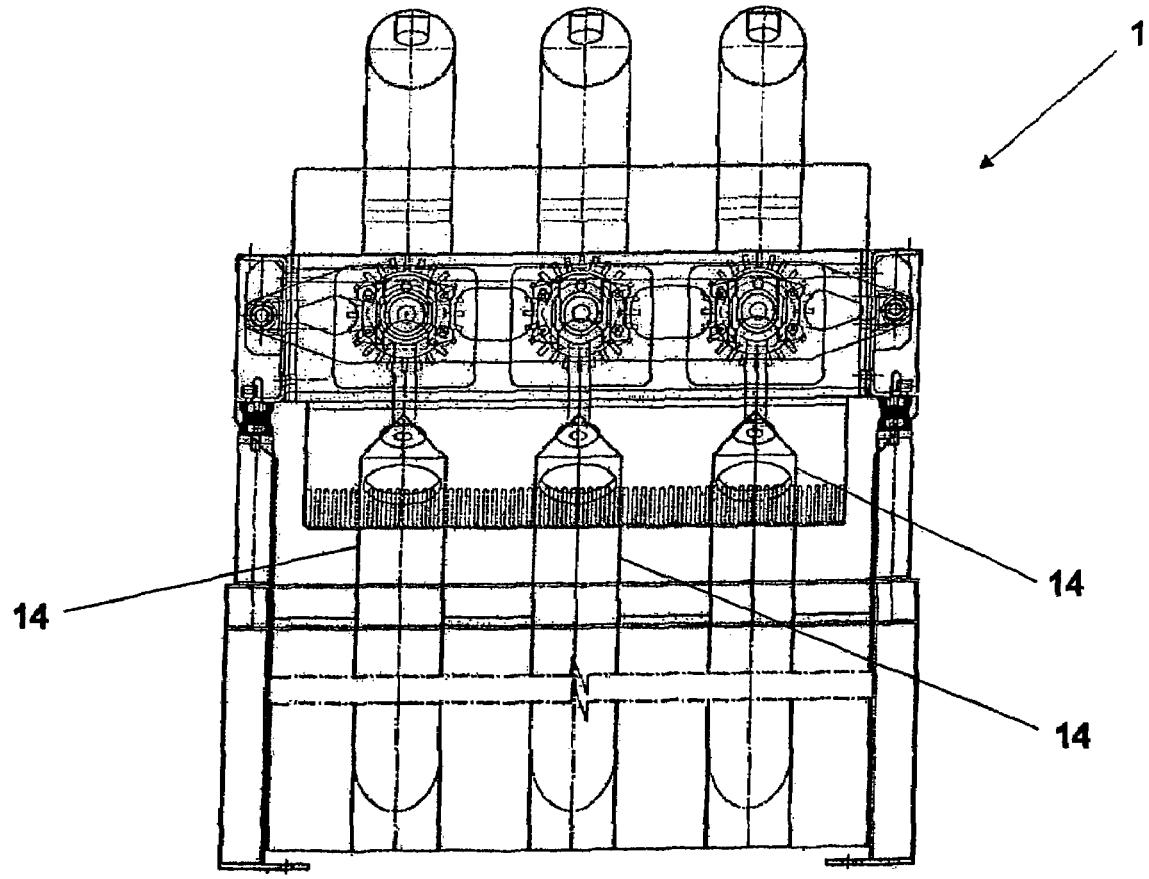
FIG. 7: A front view of the invention based on the illustration in FIG. 4.

The invention is best seen as described in the figures above mentioned, in a manner that only a single actuator (2) drives three movable peeler concave cups (4) (concave and hemispherical), be it hydraulic, pneumatic, screw, electric, or other type of actuation device, in a manner that the movable concave peeler cups (4) are driven in a simultaneous manner against the fixed peeler cups (3), thus forming matched pairs of peeler cups. As observable in the embodiment depicted in FIGS. 3 and 4, each cup (3 and 4) comprises a plurality of outwardly extending blades (38 and 39, respectively) emanating from a central structure (40 and 41, respectively) positioned along an axis of movement (42) of the movable peeler cup (4). It is noted that there are parallel axes of movement, one for each of the matched pairs of fixed and movable peeler cups. As observable FIGS. 2 and 5, the blades of the matched fixed and movable peeler cups cooperatively intermesh as the movable peeler cup advances to the fixed peeler cup during the extraction stroke of the juicing cycle. This cooperative intermeshing provides for the peeling of the fruit.

It is noted that the central structure (40) of the fixed peeler cup comprises a filtering device (7), itself comprising a cutting point (43) in its front end opening (which as depicted is positioned rearward with respect to the chassis), which may be removable for ease of operation and maintenance, and radial slits (not shown in figures) along the side(s) of the filtering device that permit passage of juice of a fruit being compressed to flow out and be collected in the lateral spaces formed by the internal sides of the fixed peeler cups (3) and the juice collector (10). Specific references are made to U.S. Pat. No. 5,720,219 for the disclosure, including FIG. 4, which depicts slits in the wall of the filtering device, and to U.S. application Ser. No. 08/681,622, including FIGS. 1, 2, 3 and 8, for disclosure of the slits of the filtering device.

The machine cycle is described by the motion of the simultaneous advance and return of the three concave movable peeler cups (4), linked in its mid position (22), through a first movable member (23), to the extremity of the actuator (2) and guided linearly by side bearing supports (24) which are pierced by push rods (25) that direct, in a cycle of advance and return, the triple concave movable peeler cups (4) against the fixed peeler cups (3). In this manner, and by the nature of the advance and return movement of the actuating device, there is substantial space compaction, therefore a significant increase in productivity for each machine cycle.

This movement is transmitted in perfect synchronism to the feed actuation member (6), that moves in a linear motion, in a manner to actuate the feed actuation spring (5), permitting that one fruit (19) staged inside the fruit capturing duct (27), which in turn was fed into the duct by the rolling feed belt (26), be conducted in a synchronous manner into each of the concave and radially cut chambers, formed by the junction of the three fixed concave fixed peeler cups (3) with each of their respective movable peeler cups (4).

On the continuation of the extraction cycle, the fruit (19) are held in the chambers formed, then during the extraction stroke are compressed by the movable peeler cups (4) against the fixed peeler cups (3). Since the pairs of peeler cups contain multiple radial openings between the outwardly extending blades, this action causes the cutting of the fruit's peel (19) in a multitude of slivers (12), that in turn pass through the radial openings of the peeler cups and fall vertically, while the cores (13) of the fruit are introduced into their respective cylindrical filtering devices (7), these having a circular cutting point in their front end opening, permitting that the cores (13) of the fruit enter completely into the filtering devices (7), which contain radial slits that allow the juice extracted (11) to flow out and be collected in the lateral spaces formed by the internal sides of the fixed peeler cups (3) and the juice collectors (10).

In the expulsion stroke of the extraction cycle, while the three movable peeler cups (4) return and move away form the fixed peeler cups (3), push rods (25) slaved to this motion, drive at its rear portion (28) a third movable member (29), that in turn, since it is solidly attached at its distal extremities (30), to two parallel pull rods (31), which are solidly attached to at their distal extremities (32) to a second movable member (33) to which is solidly affixed three plungers (8), which directs said plungers (8) through the cylindrical filtering devices (7), and push directly on the fruit's core (13) until these are completely expelled, exiting through the frontal openings of the filtering device (7), and, finally, the fruit cores (13), now dried of readily extractable juice, fall through the chambers formed by the fixed (3) and movable peeler cups (4), and thus are launched down toward the core collector duct (14), in manner such that all of the basic products and sub products: juice (11), peel (12) and core (13), can now be directed to their other stages of processing Since the movable peeler cups (4) are now totally open, the machine is now ready to initiate a new cycle of juice extraction, beginning, for example, with three new fruits dropping respectively into the three spaces formed by the open position of the three movable peeler cups (4). Although not explicitly depicted in the figures (due to the planes of FIGS. 4 and 5), some of the blades of the peeler cups (3 and 4) in the bottom half of a circle defining the peeler cups (3 and 4) are elongated sufficiently so as to serve as support for each fruit as it drops into the respective space. This is depicted and described in U.S. Pat. No. 5,720,218, which is incorporated by reference specifically for this teaching.

The invention also includes, in some configurations and versions, spray nozzles (21), mounted in different positions on the chassis (34), in a manner such that the liquid and/or vaporized spray can be utilized, controlled by a computer or other methods, for the automatic cleaning of the machine, in time periods predetermined as defined by necessity.

Example 1

The following summary example is provided for one embodiment of the present invention, as depicted in FIGS. 1-7. In this embodiment, are three fixed peeler cups (3), attached to a chassis (34) and three movable peeler cups (4) that match with each other forming three pairs of movable (4) and fixed (3) peeler cups, placed in parallel and side by side on a first movable member (23), where the movable peeler cups (4) are solidly attached at one extremity of a single actuator (2). The actuator can employ various drive technologies, including hydraulic, pneumatic, electrical, gearing, screws, or any other combination of known drive systems, being that the motion is restricted to a simple action of advance and return, directing the three peeler movable cups (4) against the three fixed peeler cups (3) during the process of extraction of juice, which occurs simultaneously in the three fruit, characterized by being a system composed of three movable peeler cups (4) placed in parallel within an extraction module (1) and being simultaneously driven by an actuator (2), linked in its mid position (22) to the first movable member (23) and linearly guided by lateral bearing supports (24), which are pierced through by push rods (25), slaved to this motion, and linked at its rear portion (28) to a third movable member (29). That third movable member (29), in turn, provides directed and simultaneous movement of the movable peeler cups (4) against the fixed peeler cups (3) in a manner that maximizes the productivity of the actuation motion. In synchronism with this movement, motion is transmitted to the feed actuation member (6), that moves in a linear motion, in a manner to actuate the feed actuation spring (5), with the ultimate result that when the peeler cups are open (4) one fruit (19) falls into each of the semi-hemispherical chambers formed by the joining of its matching pair fixed peeler cup (3). Elongated blades (not shown in the figures) hold a fruit in the space, or chamber, formed between each matched pair of fixed and movable peeler cups. With the return closing movement of the movable peeler cups (4) of the extraction stroke, these in turn closing over the respective fruits (19) inside the chambers formed by the joining of the fixed (3) and movable (4) peeler cups, and thus cutting peel slivers (12), initiating the peeling process, the stroke continues and further continuing the cycle of juice production is the introducing of the cores (13) into the filtering devices (7) since these filtering devices have a circular cutting point (43) in their frontal opening, which is oriented rearward relative to the front of the chassis (34). This permits that the fruit cores (13) enter the filtering devices (7), that contain radial slits that make possible the extracted juice (11) to flow out and be collected in the internal space formed at the junction of the fixed peeler cups (3) and the juice collector (10). During the return expelling stroke of the movable peeler cups (4) to fully open position, the movable peeler cups (4) by being solidly linked to push rods (25), slaved to this motion, drive at its rear portion (28) the third movable member (29), that in turn, since it is solidly attached at its extremities (30), and to two parallel pull rods (31), which are solidly attached to at their extremities (32) to a second movable member (33) to which is solidly affixed three plungers (8), directs said plungers (8) through the cylindrical filtering devices (7), and push directly on the fruit's core (13) until these are completely expelled, exiting through the frontal openings of the filtering device (7). Then the fruit cores (13), now dried of readily extractable juice, fall through the chambers formed by the fixed (3) and movable peeler cups (4), and thus launch down toward the core collector duct (14) the cores (13), in manner such that all of the basic products and sub products: juice (11), peel (12) and core (13), can respectively be directed to other stages of processing. At the end of this cycle, with the movable peeler cups (4) totally open, the machine is ready to initiate a new cycle of extraction of juice (11).

Based on the drive mechanism depicted in FIGS. 2-6, it is appreciated that a the direct drive from the actuator provides the force to move the movable peeler cups through the extraction and expulsion strokes of the juicing cycle. In certain embodiments, such as that depicted in these figures, springs 45 are used to assist in the cycling of movements. The springs 45 (two on each side, one not viewable in the exposed side) work to provide some force through the push rods 25 via the third movable member 29, and overall serve to dampen vibration. Dampening also is effectuated by the use of hard rubber contact pads, 46, (or other contact pad material) between the third movable member, 29, and the ends 28 of the pull rods 25. The contact pads 46 alternatively may be affixed to and move with the pull rods 25, or may be attached to the third movable member 29.

It is appreciated that the configuration of elements shown in the figures and discussed herein is not meant to be limiting. As one example of an alternative configuration, the actuator may be connected to drive the first movable member directly, and the first movable member may connected by pull/push rods to the second movable member, thereby achieving the desired linkage of motion without a third movable member. As an example of other alternative configurations, the pull rods connecting the second movable member to the first movable member or to the third movable member (in embodiments that include such member) may be positioned to pass above or below the horizontal plane defined by the peeler cups, or may be positioned to pass between matched sets of peeler cups. Also, as an additional example of alternative configurations where there are connected a first movable member and a third movable member, stabilizing/force transfer components other than the push rods described above may be employed. For instance, not to be limiting, the ends of the first movable member may travel along guides or channels positioned along the adjacent chassis walls, these may be designed to confer a stabilizing effect against possible end-to-end distortion of the reciprocating movement, so that only the actuator is contacting the back side of the first moving member (rather than this and the pull rods).

Figure 2:
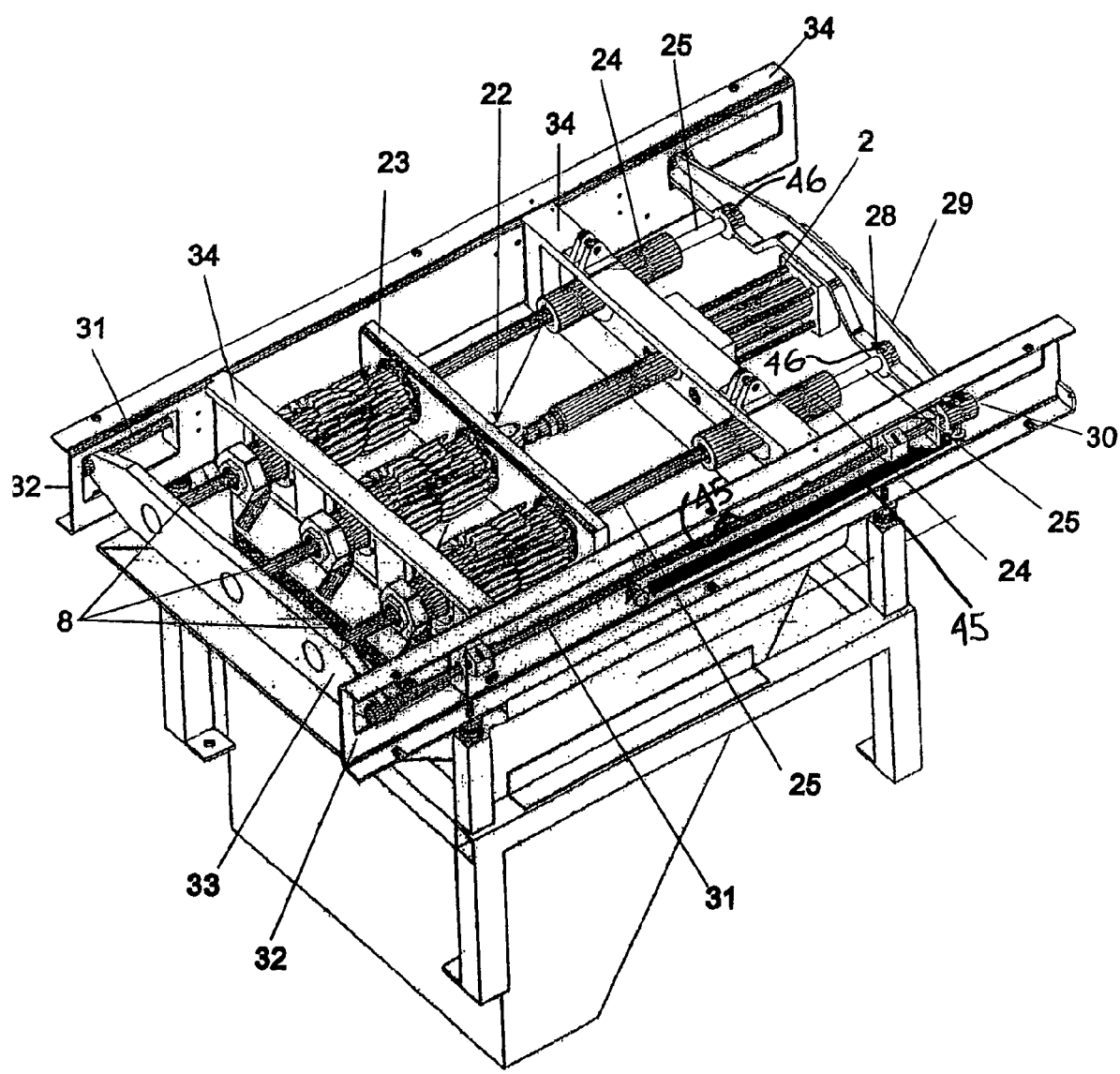
FIG. 2: A perspective view of a single module of the improvement in a large scale modular fruit juice extraction system, with the peeler cups in the closed position.

Other embodiments of the present invention utilize a coordinated drive mechanism wherein the actuator is of a type that expands and contracts, and is fixedly attached at its rear end to a third movable member (such as is depicted as 29 in FIG. 2). In such embodiments a plurality of auxiliary rods (such as the two pull rods 25 in FIG. 2) are also fixedly attached to the third movable member (i.e., are attached rather than contacting). In such embodiments, the force for the reciprocating motion to the movable peeler cups is directed through an actuator rod (i.e., the rod connecting to 22 in FIG. 2 from actuator 2) as well as the plurality of auxiliary rods, and thereby is delivered to a plurality of points along a first movable member bearing the movable peeler cups.

It also is appreciated that, in a general sense, a "multi-peeler cup drive assembly" may include the above-described assembly of components comprising the first movable member, the third movable member, the actuator, and the push rods between the first and third movable members. However, the term "multi-peeler cup drive assembly" alternatively may apply to any arrangement of component comprising an actuator (i.e., a power source or drive member from a power source) that supplies the reciprocating motion to a plurality of movable peeler cups. For example, not to be limiting, one embodiment of a multi-peeler cup drive assembly of the present invention comprises the third movable member connected to the actuator, and the actuator and a plurality of push rods connected to the third movable member so that each, individually yet in a coordinated manner, connect to and alternately push and pull a movable peeler cup, such as where there is no first movable member between the respective movable peeler cup and the corresponding actuator end or push rod. Other arrangements of a multi-peeler cup drive assembly may likewise be designed and fabricated, and remain within the scope of the present invention.

Accordingly, while embodiments of the present invention have been shown and described herein in the present context, such embodiments are provided by way of example only, and not of limitation. Numerous variations, changes and substitutions will occur to those of skilled in the art without departing from the invention herein. For example, the present invention need not be limited to best mode disclosed herein, since other applications can equally benefit from the teachings of the present invention. Accordingly, it is intended that the invention be limited only by the spirit and scope of the appended claims.

What is claimed is:

1. A fruit juicer comprising:
   a. a plurality of fixed peeler cups attached to a chassis, each fixed peeler cup comprising a filter device having a fruit core receiving opening centrally disposed among a first plurality of outwardly extending blades;
   b. a plurality of movable peeler cups interconnected by a first movable member, each movable peeler cup comprising a second plurality of outwardly extending blades cooperatively intermeshing with the first plurality of outwardly extending blades and disposed along a respective horizontal axis for reciprocating horizontal movement toward and away from a respective one of the fixed peeler cups during alternating extraction and expulsion strokes;
   c. a second movable member connected to the first movable member for movement of the first and second moveable members concurrently in the same direction during respective extraction and expulsion strokes;
   c. a plurality of plungers connected to the second movable member, each plunger aligned with a respective one of the axes for reciprocating movement into and out of a respective filter device during respective expulsion and extraction strokes, the movement of the plungers into the respective filter devices effective to expel a fruit core from the respective filter device through the fruit core receiving opening during the expulsion stroke as the movable peeler cups move away from the fixed peeler cups; and
   e. a single actuator connected between the chassis and one of the movable members for energizing the reciprocating movement of all of the movable peeler cups and plungers.

2. The fruit juicer of claim 1, further comprising:
   a. a third moveable member; and
   b. a plurality of push rods interconnecting the third moveable member and the first moveable member.

3. The fruit juicer of claim 2, wherein the second moveable member is connected to the first moveable member by a plurality of pull rods interconnected there between.

4. The fruit juicer of claim 3, further comprising the pull rods being interconnected between respective distal ends of the first and second moveable members.

5. The fruit juicer of claim 2, wherein the third movable member is disposed on a side opposed the first movable member relative to the movable peeler cups.

6. The fruit juicer of claim 2, further comprising the actuator being connecting centrally to the third movable member with an equal number of the push rods being disposed on opposed sides of the actuator.

7. The fruit juicer of claim 1 wherein each filter device comprises a sharpened end disposed toward a chamber formed by a respective fixed peeler cup and movable peeler cup, and a plurality of slits along a wall section of the filtering device for passage of juice compressed from the fruit.

8. The fruit juicer of claim 1 wherein the plurality is three, and the actuator is connected to a middle of the first movable member along a first of the axes with a second and a third of the axes being spaced equidistant from the first of the axes.

9. A fruit juice extraction apparatus comprising:
   a. three fixed peeler cups attached to a chassis;
   b. three movable peeler cups corresponding to the three fixed peeler cups and forming three pairs of movable and fixed peeler cups placed in side by side arrangement;
   c. the movable peeler cups each being attached at one extremity of a single actuator providing advance and return motion directing the three movable peeler cups simultaneously toward and away from the respective three fixed peeler cups during a cycle of extraction of juice;
   d. the three movable peeler cups placed in parallel and being simultaneously driven by the actuator within an extraction module, the actuator linked in its mid position to a first movable member and linearly guided by lateral bearing supports which are pierced through by push rods slaved to this motion, and linked at its rear portion to a third movable member, that in turn, provides directed and simultaneous movement of the movable peeler cups against the fixed peeler cups;
e. a feed actuation member permitting a fruit to fall into respective semi-hemispherical chambers formed by the joining of the respective pairs;
f. three respective filtering devices cooperatively associated with the respective fixed peeler cups, the filtering devices each have a circular cutting point in their respective frontal openings;
g. the filtering devices comprising respective radial slits;
h. the third movable member being linked to the push rods;
i. the third movable member in turn, is attached at its extremities to two parallel pull rods which are attached at their respective extremities to a second movable member, to which is solidly affixed three respective plungers.

10. A fruit juicer comprising:

a plurality of fixed horizontal peeler cups affixed to a chassis member and extending into a fruit peeling area;

a plurality of movable peeler cups attached to a first movable member within the fruit peeling area;

a single actuating element disposed outside the peeling area and comprising a drive rod extending into the peeling area and attached to the first movable member for producing reciprocal horizontal linear motion of the movable peeler cups into engagement with the fixed peeler cups during an extraction stroke and away from the fixed peeler cups during an expulsion stroke;

each of the peeler cups comprising a plurality of outwardly extending blades effective to slice a peel of a fruit disposed between respective fixed and movable peeler cups into a plurality of slices within the peeling area during the extraction stroke;

a respective filter device attached to each fixed peeler cup and extending outside the fruit peeling area, each filter device comprising a fruit core receiving opening in communication with the respective fixed peeler cup and effective to receive a core of the fruit compressed between the respective fixed and movable peeler cups during the extraction stroke;

a juice collecting element outside the fruit peeling area and in fluid communication with each filter device and effective to collect juice squeezed from the respective fruit core during the extraction stroke while avoiding contact between the juice and the peel slices;

a plurality of plungers attached to a second movable member outside the peeling area, a respective plunger disposed within each filter device;

a pull rod attached to each distal end of the second movable member outside the peeling area and jointly driven by the single actuating element for reciprocal linear horizontal movement of the plungers into the respective filter devices to expel the core of the fruit through the fruit core receiving opening and into the fruit peeling area during the expulsion stroke.

* * * * *